United States Patent [19]

Baer et al.

[11] 4,194,198
[45] Mar. 18, 1980

[54] DIGITAL PREPROGRAMMED TELEVISION GAME SYSTEM

[75] Inventors: Ralph H. Baer, Manchester; Leonard D. Cope, Nashua, both of N.H.

[73] Assignee: Sanders Associates, Inc., Nashua, N.H.

[21] Appl. No.: 922,451

[22] Filed: Jul. 3, 1978

Related U.S. Application Data

[63] Continuation of Ser. No. 679,301, Apr. 22, 1976, abandoned.

[51] Int. Cl.² ............................................ G06K 15/20
[52] U.S. Cl. .................................. 340/724; 273/85 G; 340/798; 358/127; 360/27; 360/79
[58] Field of Search ............... 340/724, 725, 798, 799; 358/127; 360/27, 32, 79; 273/85 G, DIG. 28

[56] References Cited

U.S. PATENT DOCUMENTS

| 3,668,648 | 6/1972 | Yoshikawa | 360/79 X |
| 3,740,491 | 6/1973 | Cook et al. | 360/27 |
| 3,921,161 | 11/1975 | Baer | 340/724 X |
| 4,016,361 | 4/1977 | Pandey | 358/127 X |
| 4,040,088 | 8/1977 | Hannan | 358/127 |

*Primary Examiner*—David L. Trafton
*Attorney, Agent, or Firm*—Louis Etlinger; Richard I. Seligman

[57] ABSTRACT

Apparatus is provided to permit the control of circuitry within a video game generator including an audio playback device employing an audio tape or phonograph disc having recorded thereon digital data which is decoded and interfaced with the video game generator.

25 Claims, 7 Drawing Figures

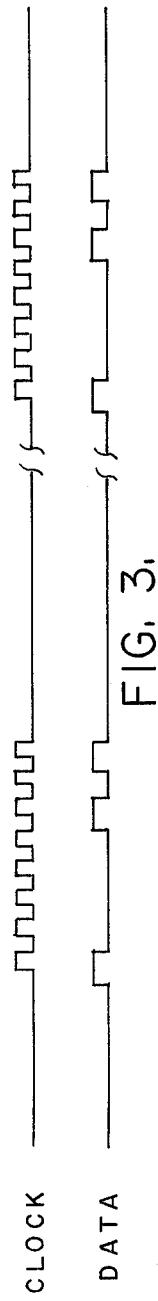
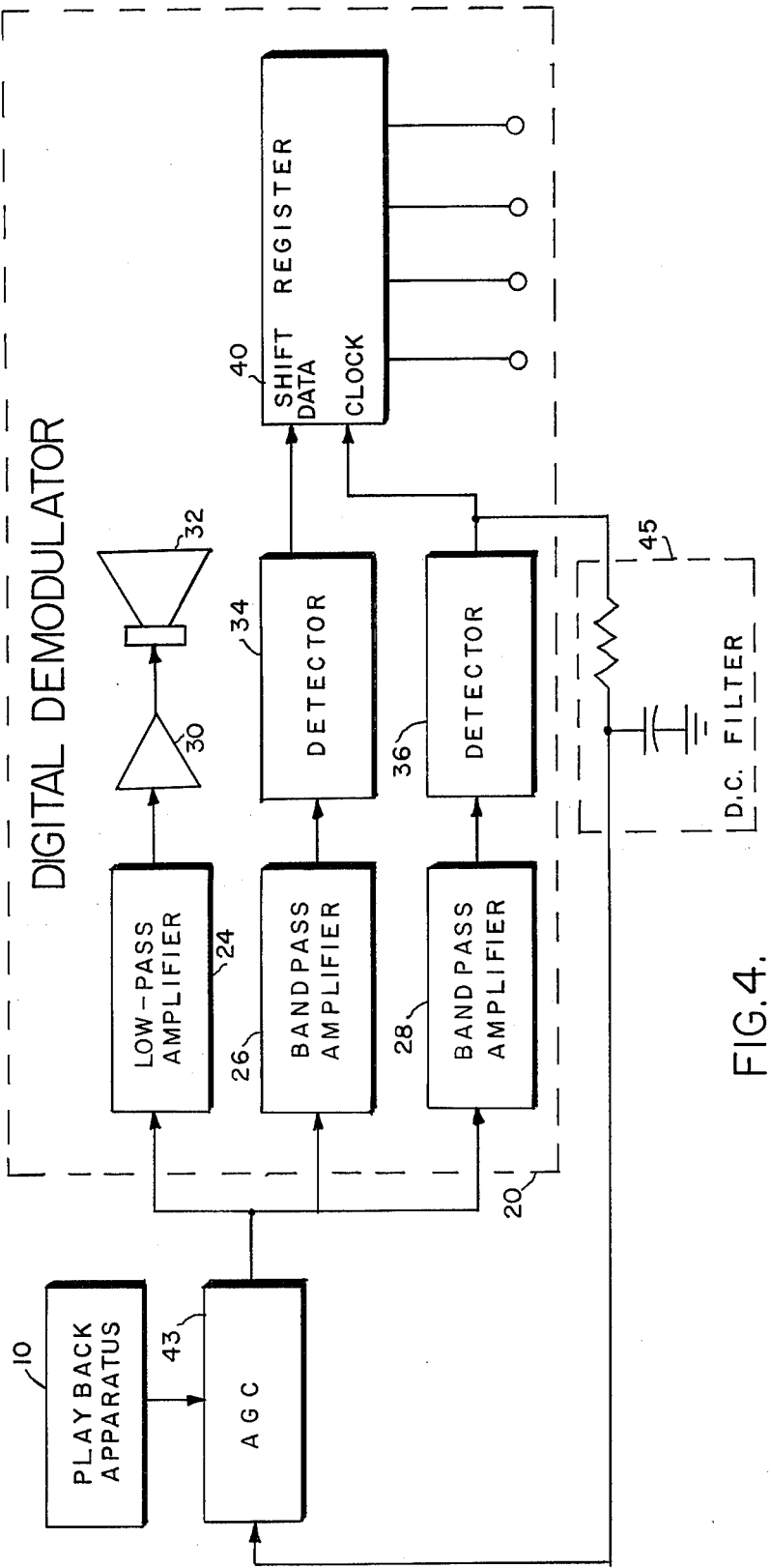
FIG. 3.
FIG. 4.

DIGITAL PREPROGRAMMED TELEVISION GAME SYSTEM

This is a continuation of application Ser. No. 679,301, filed Apr. 22, 1976, now abandoned.

BACKGROUND OF THE INVENTION

Electronic game playing devices which generate signals for symbols to be displayed on the screen of television receivers are known in the prior art and well illustrated by U.S. Pat. Nos. 3,728,480; 3,778,058; 3,829,095; Re 28,507 and Re 28,598, all assigned to the assignee of the present invention, the entire disclosures of which are specifically incorporated herein by reference. The electronic game playing devices represented by these patents are game attachments for a raster scan display such as a conventional television receiver or television monitor and having electrical circuitry or components for generating signals which when supplied to the raster scan display will cause the display to show on the screen thereof moveable game playing indicia or symbols or spots. Alternatively, the game playing devices may be incorporated in the raster scan display itself.

The devices of certain ones of the aforementioned patents may be used to play several different games wherein certain ones of the symbols rebound from others when coincident therewith or disappear from the screen of the display when coincident therewith or experience other distinctive motions upon coincidence. Typical games employing these features would be simulated chase games, maze games, ping pong, hockey, tennis, handball and the like. In certain ones of these categories of games one or more player symbols are generated along with a game playing object or ball or puck spot such that the player spots are individually controllable in at least one direction.

Typically each participant or player is provided with one or more potentiometers for controlling at least the vertical and possibly also the horizontal location of his displayed symbol. In a typical game, as for example ping pong, the ball spot is caused to execute a horizontal sweep across the screen of the display until it is intercepted by a player spot across its direction of sweep. Ball motion is typically controlled by the charging and discharging of a capacitor, however, digital circuitry such as counters may be used instead. In a hockey game, for example, if the ball is not intercepted by a player but allowed to be hit into the goal then it may move to an off-screen position until reset by one of the players.

Many other representative games are also disclosed by the aforementioned patents. In order to extend the scope of the game playing devices apparatus was added to the devices described in the aforementioned patents to provide preprogrammed behavior for certain variables of the displayed spots or symbols. This is illustrated by U.S. Pat. No. 3,921,161, also assigned to the assignee of the present invention. In this patent a preprogrammed means such as a magnetic tape and tape reader is illustrated as being coupled to the game playing devices for automatically controlling certain ones of the variables of the displayed symbols in accordance with the information recorded on the tape to, thus, allow active participation by a player in determining the progress of the game while part of the progress of the game is predetermined by the information recorded on a selected game tape. The information recorded on the tape is analog information which simulates the electrical signals outputted by the controls of the game. As mentioned above, typically a pair of potentiometers is used for controlling the horizontal and vertical locations of a symbol; instead of using these potentiometers for actual symbol control they are used in conjunction with a voltage source to provide recorded audio analog information on the tape and the output of the tape is applied to one or more of the controls for a symbol, for example, a player symbol to automatically cause positioning of the symbol representing a player. The disclosure of U.S. Pat. No. 3,921,161 is limited in that it requires a relatively large amount of bandwidth and is relatively expensive. Furthermore, it is limited in use in that it requires the generation of the actual control signals to be recorded on the pre-recorded means, such as an audio tape or disc.

SUMMARY OF THE INVENTION

Accordingly, it is an object of the present invention to extend the scope of existing television type game playing devices.

It is another object of the present invention to provide improved prerprogrammed behavior for a television type game display.

It is a further object of the present invention to add greater versatility to television type game circuits.

It is yet another object of the present invention to provide a versatile auxiliary input device for television game circuitry.

It is yet a further object of the present invention to provide improved preprogrammed television game devices.

It is still another object of the present invention to permit the control of circuitry within a television game generator via prerecorded digital data extracted from a playback unit in conjunction with a digital demodulator.

In accordance with one embodiment of the present invention a preprogrammed means such as an audio tape or phonograph disc is provided and which contains recorded thereon digital data suitable for affecting the course of a television type game being played by one or more participants. For example, this recorded digital data may be used to control such parameters of a game as the position of a ball or player or it may be used to initialize various hardwired circuits within a TV game control electronics such as switch into operation a particular game function thereby obviating the need for the user to throw switches.

In one embodiment of the invention a preprogrammed means such as an audio cassette playback unit is provided with a cassette having a digital data recorded thereon as well as audio information such as voice or background music. The digital information recorded on the tape is recorded in the form of audio tones. One series of audio tones at a frequency of, for example, seven KHz comprises a clock signal while a second series of audio tones at a frequency of, for example five KHz, comprises a data signal. The output from the audio cassette playback unit taken at, for example, the earphone jack thereof is applied to three filters: a low pass filter which rolls off on the order of 3.5 KHz to provide the audio (voice or music), the output from which is applied to a speaker via a power amplifier; and two bandpass amplifiers of seven KHz and five KHz respectively, to separate the clock and data signals. The outputs of the bandpass amplifiers are detected and applied to a shift register whereby the clock signal is applied to the clock input of the shift register to read in the data signal applied to the data input of the shift register. In this manner the clock and data signal tones are decoded such that at each output position of the shift register there is a bit of a data word which may be used for many functions. For example, if a four bit data word is stored in the shift register, each bit of the word may be used to actuate some particular game playing function or each of the bits (1's and 0's) may be used in conjunction with an integrator to instruct a symbol generator to move up or down in the vertical direction or left to right in the horizontal direction.

BRIEF DESCRIPTION OF THE DRAWINGS

The above-mentioned and other features and objects of this invention will become more apparent by reference to the following description taken in conjunction with the accompanying drawings, in which:

FIG. 3 is a series of waveforms illustrating a different characteristic clock and data signals;

FIG. 4 is a block diagram of an alternate embodiment to that of FIG. 1 and employing the signals of FIG. 3;

DESCRIPTION OF PREFERRED EMBODIMENT

Figure 1:
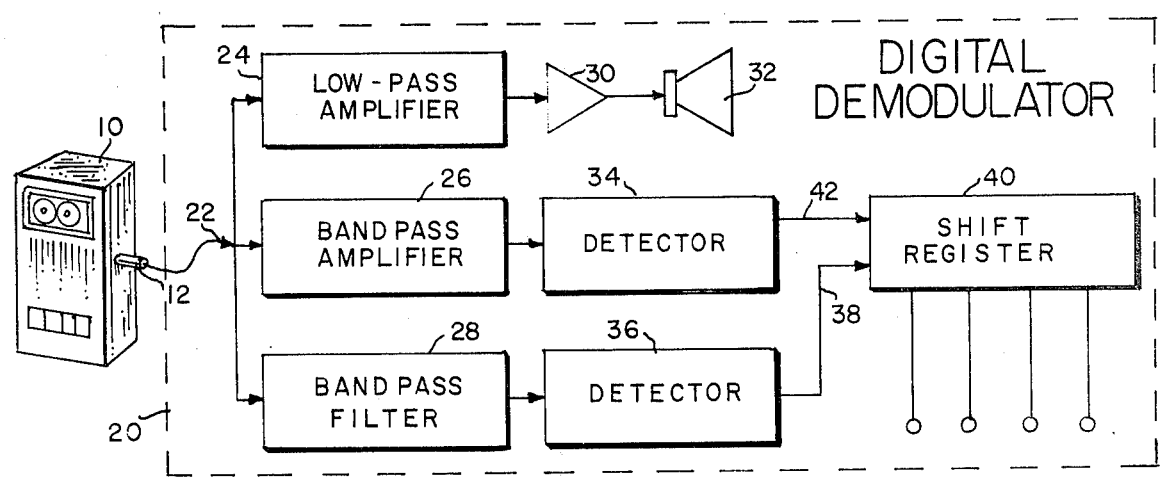
FIG. 1 is a block diagram of a system allowing the extraction of digital data recorded on a standard low-cost cassette playback unit and means for detecting this data and for decoding same.

Referring now to FIG. 1 of the drawings, there is illustrated thereby one embodiment of the invention including a standard audio playback device 10. In the embodiment shown playback device 10 is a conventional low-cost magnetic cassette playback unit. However, any conventional playback machine can be used, as for example, those commonly used for voice and music recordings, such as reel to reel magnetic tape recorders and disc playback devices. The output of cassette playback unit 10 is taken at a jack 12 which in the present embodiment is the output of the cassette playback unit which is conventionally provided for an earphone output. Recorded on the magnetic cassette tape of playback unit 10 is digital data comprising audio tone bursts as well as audio information such as voice or music.

Figure 2:
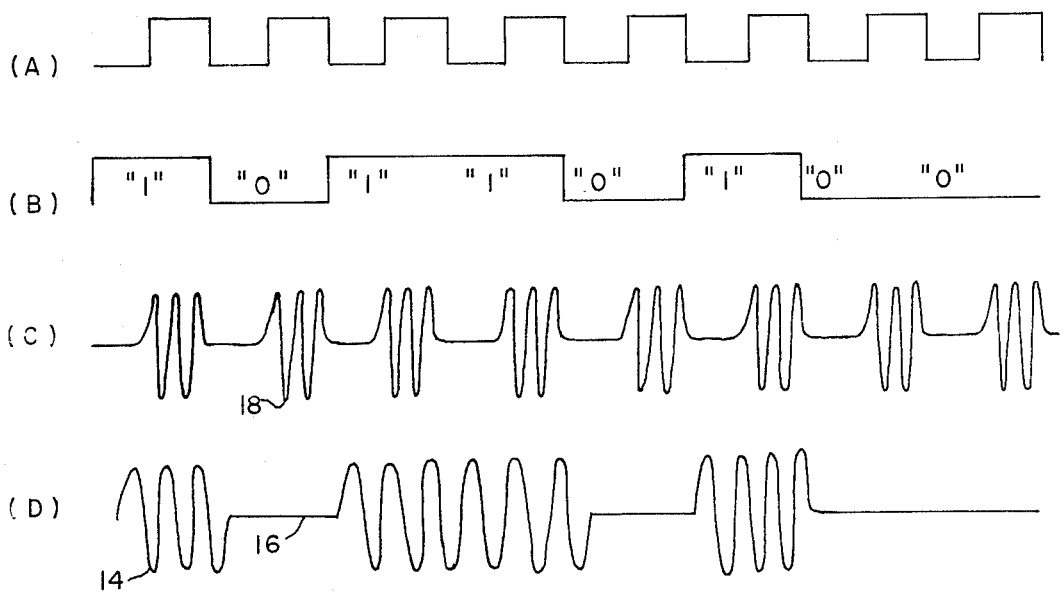
FIG. 2 is a series of waveforms illustrating the characteristics of the data recorded on the audio cassette of FIG. 1.

A typical data signal consisting of tone bursts is shown in waveform D of FIG. 2 wherein digital 1's are represented by a tone burst 14 and digital 0's are represented by the absence of any tone burst during a predetermined period 16. In this embodiment of the invention it is preferred that the magnetic cassette tape also have a clock signal recorded thereon. The clock is typically represented by waveform C of FIG. 2 consisting of tone bursts 18. However, these tones 18 will be of a different frequency than that of the data signal for purposes of separation. The waveforms C and D of FIG. 2 are represented for tutorial purposes only and the number of cycles represented for each burst does not represent the number which would actually be used as discussed hereinafter.

The waveforms A and B of FIG. 2 are representations of the clock signal waveform and the data signal waveform as originated by a producer of the program. In order to record the clock and data signals of waveforms A and B on the magnetic tape they are converted to pulse bursts of different frequencies as shown in waveforms C and D. In one example the pulse bursts 18 of the clock signal are generated at seven KHz while the pulse bursts of the data signal representing the logical 1's are generated at five KHz. Assuming that up to ten cycles may be required before playback 10 develops at level 1 signal output because of the limited bandwidths of such equipment, the prerecorded pulse bursts used preferably last for at least ten cycles during both the clock burst period of waveform C and the logical 1 period of the data waveform represented in waveform D. As in conventional fashion the data signal is shown out of phase with the clock signal and preceeding same. This is to insure that the data signal will have become available to a device at the time the clock signal arrives such that the clock signal may clock the data signal into the device.

Referring again to FIG. 1, the output of the cassette playback unit 10 taken at jack 12 is applied to a digital demodulator 20. The input 22 of digital demodulator 20 is coupled to three amplifiers 24, 26 and 28. The lowpass amplifier 24 recovers the voice or music components of the signal recorded on the magnetic cassette tape. Typically, this amplifier is designed to roll off at approximately 24 db/octave at 3.5 KHz thus providing adequate fidelity and intellegibility while allowing ample bandwidth for the two tone burst signals also recorded on the magnetic cassette tape.

In a practical low cost cassette player the usable upper frequency is generally on the order of approximately seven KHz, hence, it is seen that using two tones at on the order of seven KHz and five KHz, respectively, will allow bandpass amplifiers 26 and 28 to be used to separate the clock tone output from the data tone output.

The output of low-pass amplifier 24 which consists of music or voice is applied to a power amplifier 30, the output from which is coupled to a speaker 32.

After bandpass filtering using bandpass amplifiers 26 and 28 the separated tone bursts are envelope detected in a pair of detectors 34 and 36 to reconstitute their original pluse waveforms as illustrated by waveforms B and A of FIG. 2. Detectors 34 and 36 preferably are simple diode detectors plus RC integrating networks to follow the envelope of the tone bursts. Preferably, the detectors 34 and 36 also each include a Schmitt trigger circuit to provide clean digital waveforms which are properly squared and have desired digital 1 and 0 voltage levels.

The clock signal output from detector 36 is applied to the clock input 38 of a shift register 40 and simultaneously the data signal output from detector 34 is applied to the data input 42 of shift register 40. Consequently, whenever a logic 1 level is obtained at data input 42 this logic signal coexists in time with the logic 1 signal applied at clock signal input 38 of shift register 40 and the clock will shift this 1 bit into the register and propagate it down through the shift register one bit position at a time for each arrival of a new clock signal at input 38. By way of example, if a four bit word is used by the system of FIG. 1 of the sequence 0-1-1-0 then four sequential clock bits will first shift a logical 0 into shift register 40 then a 1 then another 1 and finally a 0. If clock pulses are now stopped or are no longer present on the prerecorded tape the four bit word 0-1-1-0 has now been stored in shift register 38. Although in the embodiment of FIG. 1 a shift register 40 is shown having only four bits of storage capacity, this is exemplary only and any number of bits may be employed, as for example, to store a longer data word or multiple data words.

Instead of clocking the shift register 40 of FIG. 1 only when new data is to be entered the clocking scheme illustrated by the waveforms of FIG. 3 may be used. Here clock bits and data bits are supplied periodically to the shift register 40. The average value of the clock is a function of the clock duty cycle, which is a function of the digital demodulator input level. Thus, the d.c. component of the clock voltage may be used as a control to an automatic gain control (AGC) circuit. Accordingly, as illustrated in FIG. 4 an AGC circuit 43 is disposed between the playback apparatus 10 and the digital demodulator 20.

The control input to AGC circuit 43 is derived from a d.c. filter 45 which filters the clock signal from bandpass amplifier 26. This allows signal levels from the playback apparatus to occupy a wide range for proper operation.

In an alternate embodiment multitrack recordings are employed obviating the need for filtering to separate the signals recorded thereon.

One concept of the present invention is the utilization of the outputs of the shift register as "function switches" capable of controlling up to four circuit functions in this example or additional functions for larger storage shift registers. By way of example, assume that the four bits are intended to control the vertical and horizontal motion of two symbols such as hockey players on the screen of a raster scan cathode ray tube display. Further, assume that a logical 1 at output 1 of shift register 40 causes a "hockey player" to rise vertically on the screen; and that logical level 0 causes the same player to descend vertically; similarly, assume that a logical 1 at output 2 causes "hockey player" motion to the right, and logical 0 results in leftward motion. Also assume that the motion of a second hockey player is similarly controlled by outputs 3 and 4 of shift register 38. Now, if new digital signals arriving periodically at shift register 38 are shifted in at a rate of 350 bits per second (1/20th the carrier modulation frequency) as shown in the examples, then a four bit word will take 11.4 milliseconds to shift fully into shift register 38. Hence, there is a transient period of less than 11.4 milliseconds during which new data bits are rippled past the various shift register outputs 1-4. After this period the desired logical 1's and 0's appear stationary at the proper output. Since this period of 11.4 milliseconds is quite short in respect to the motion of the "hockey players" on the CRT screen and this motion generally involves response to the charging and discharging of an RC integrator network typically employed in video game circuits the loading period noise is filtered out and has no consequential effect on the position of the hockey players.

Using another example, if shift register 38 instead has additional storage bits the next storage bit in a digital word could be assigned to blanking a symbol displayed on the CRT screen. An RC filter with a time constant of approximately ten times the load interval or 100 milliseconds at the fifth output of the shift register would eliminate the noises generated during the shifting in period and would result in logical 1 and 0 voltage (typically +5 volts and 0 volts, respectively) at a fifth output. This logical level signal can be applied to a gate controlling the blanking and unblanking of the desired symbol on the TV screen.

Figures 5, 6:
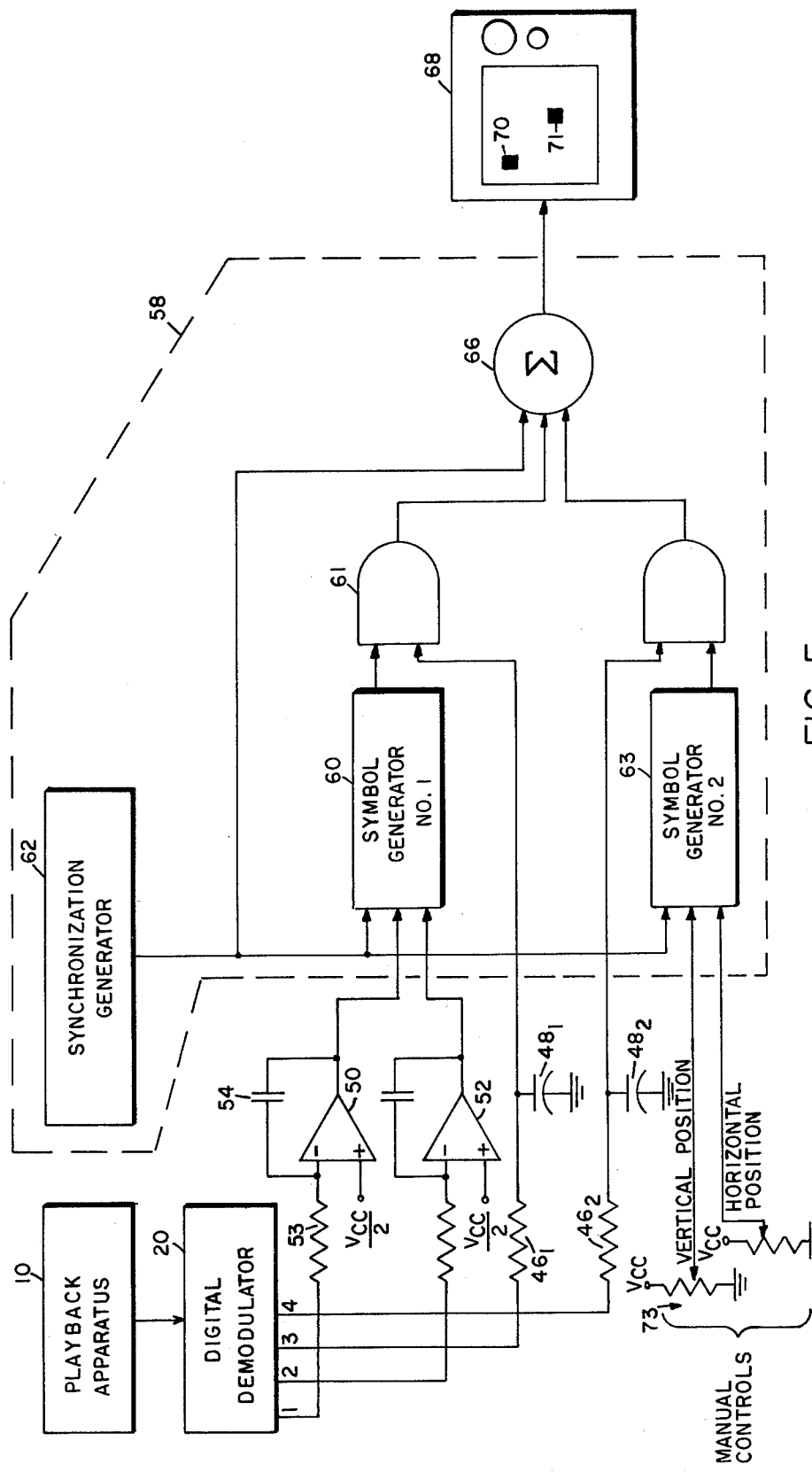
FIG. 5 is a simplified block diagram of the apparatus of FIG. 1 or 4 and further including a system for using the data recorded on an audio cassette to provide preprogrammed motion of symbology displayed on the cathode tube of a raster scan display.
FIG. 6 is a block diagram of a further application of the embodiment of FIG. 1 or 4 showing the utilization of the apparatus thereof to control a variety of television game functions.

Referring now to FIG. 5 of the drawings, there is illustrated thereby an application of the system and apparatuus described in connection with FIGS. 1 and 2 hereinbefore resulting in a preprogrammed motion of symbology displayed on the screen of a raster scan display such as a television receiver, or monitor. Digital demodulator 20 is supplied with prerecorded data bit streams from cassette tape playback unit 10 and produces either logical 0 or 1 outputs at terminals 1-4 thereof. The voltage levels from terminals 1 and 2 are applied to integrators 50 and 52 and from terminals 3 and 4 to filters comprising resistors $46_1$–$46_4$ and capacitors $48_1$–$48_4$. Assume, for example, that output terminal 1 from digital demodulator 20 has a logic level 1 (for example, +5 volts) thereon. This voltage is applied through resistor 53 to the negative input of integrating amplifier 50 and integrating capacitor 54. As a result, the output voltage from the amplifier 50 taken on line 56 will start to ramp downward in a negative direction and will continue to ramp downward as long as the logical 1 signal persists on output 1 of digital demodulator 20.

This line 56 is applied to television game circuits 58, for example, of the type set forth in U.S. Pat. No. Re 28,598. The game circuits include symbol generators 60 and 63 which receive as an input thereto horizontal and vertical synchronization signals from a synchronization generator 62. The outputs from the symbol generators 60 and 63 are applied to a summer 66 along with the synchronization signals from synchronization generator 62 and applied to a raster scan cathode ray tube display 68 to generate symbols such as 70 and 71 on the screen thereof. The output of summing circuit 66 is either coupled directly to the video circuits of display 68 or in an application wherein the display is a conventional home-type television receiver it is applied through a modulator and rf oscillator to the antenna terminals of the receiver.

If the negative ramping voltage from integrator 50 is applied to the vertical positioning input of symbol generator 60 the corresponding symbol 70 on the screen of the display 20 will move downward. The speed of the motion of symbol 70 is determined by the component values associated with a resistor 53 and capacitor 54 and the position versus input voltage relationship of symbol generator 60. Assume now that output 1 from the digital demodulator returns to the 0 voltage level (logical 0) due to a preprogrammed tape command signal. Immediately the output of integrator 50 will reverse and ramp upward (go in a positive direction) thus reversing the movement of on-screen symbol 70. If the prerecorded commands alternate rapidly between 1's and 0's an equilibrium can be seen to exist at the input and output of intergrator 50. Hence, vertical motion of the symbol displayed on the screen will cease.

A similar sequence of events at output line 2 of digital demodulator 20 will result in corresponding horizontal motion of the displayed symbol 70. Furthermore, the output of the filter comprised of resistor 46, and capacitor 48, may be used to blank the output of symbol generator 60. If output 3 of digital demodulator 20 is set to a logic level of 0, the filter will input a logic 0 to an AND gate 61. This will blank the output of symbol generator 60, and remove symbol 70 from the CRT screen. Thus, it can be seen that the direct utilization of the voltage levels corresponding to logical 1's and 0's of the output of digital demodulator 20 can be used to control the position of television type game symbology quite simply and therefore inexpensively.

The symbol 71 generated by symbol generator 63 is controlled by a participant using manual controls 73 in the manner described in any of the aforementioned U.S. patents.

Refer now to FIG. 6 of the drawings wherein there is illustrated a generalized method according to the present invention for playing television type games using a preprogrammed digitally recorded tape or other medium. As can be seen from the FIG. the prerecorded data from the cassette playback unit 10 is applied to digital demodulator 20 as described hereinbefore. The latter may contain a shift register of any practical length appropriate to the application. Therefore, digital words of any practical length such as 4, 8, 12, 16 or 24 bits as is common in digital data systems may be shifted from the prerecorded source into storage. These digital words are then applied in parallel to a data processing logic subsystem 74. The latter may be as simple as an analog converter used to output d.c. positioning voltages for use with symbol generators or may be as complex as a small microprocessor containing intrically stored software. In the latter case the microprocessor may be considered as felxible software programmable multicontext switchboards capable of switching circuit components in their interconnections so as to produce a large number of different television type games under control of both the preprogrammed tape and human participants. The output from the data processing logic 74 is applied to the TV game circuits 58 the output from which is applied to the raster scan display 68.

Figure 7:
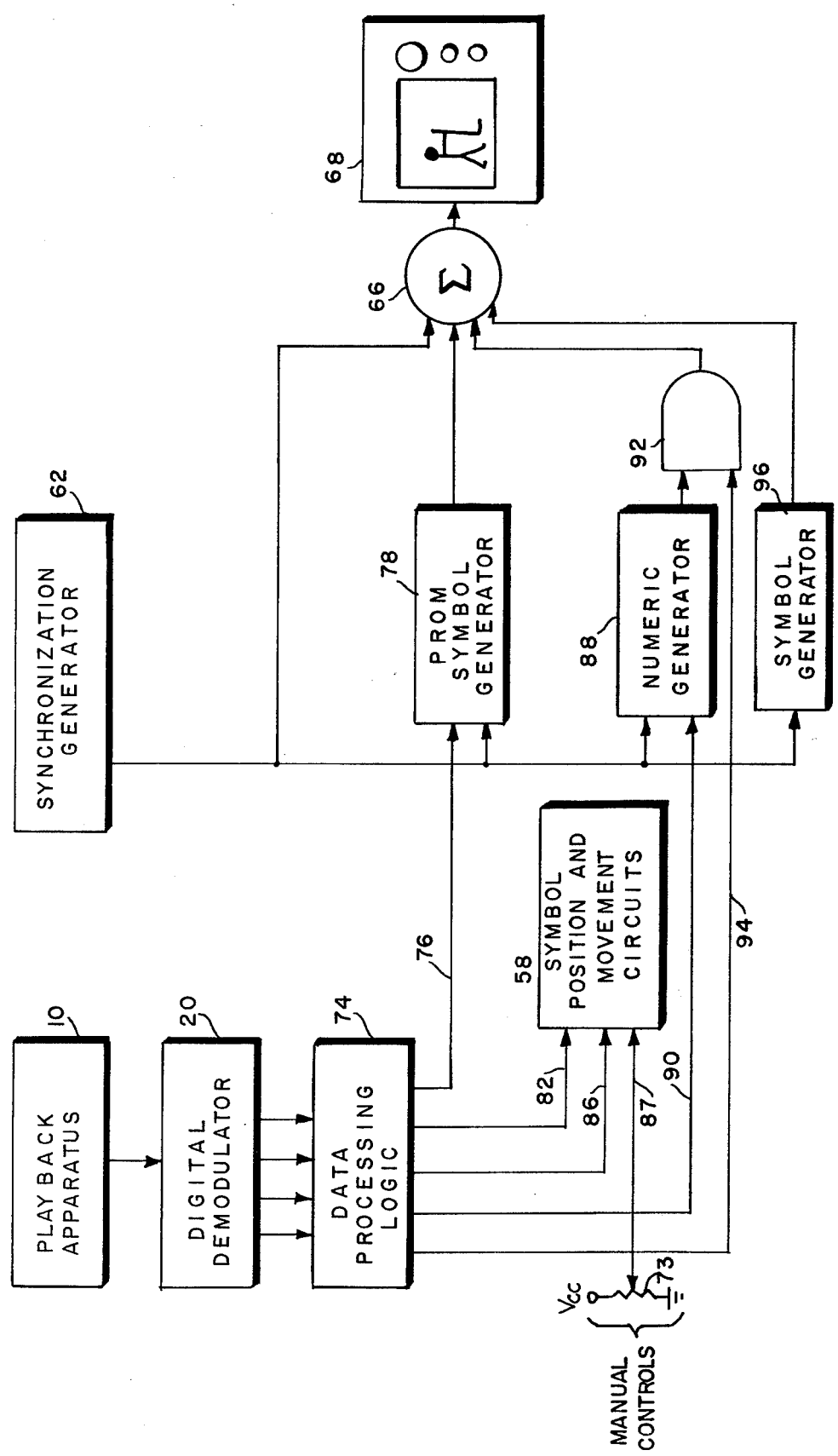
FIG. 7 is a block diagram illustrating in greater detail the embodiment of FIG. 6.

FIG. 7 is a more detailed version of a system like that of FIG. 6 illustrating the manner in which a simulated hockey game is to be played by one or more players or participants in conjunction with preprogrammed recorded digital data. In FIG. 7 the information from playback apparatus 10 is applied to digital demodulator 20 and thence to the data processing logic system 74 where it is decoded to represent a command. The command signal is applied via a line 76 to a preprogrammed programmable read only memory symbol generator 78 to output raster scan signals representing simulated hockey players 80 which are displayed on the screen of a raster scan video display 68.

The next digital word from the digital demodulator 20 is applied to the data processing system 74 and outputted by way of a line 82 to symbol position and movement circuits, that is, to the game circuits 58. This signal switches the game components within the game circuits 58 to provide such game components as speed control for a simulated puck to permit rapid motion thereof (simulating fast ice) or game functions such a motional advantage (like speed) for one plauer versus another.

A subsequent digital word from digital demodulator 20 up-dates the vertical and horizontal positioning symbol inputs to the game control circuits 58 via a line 86. These would control the position of one of the simulated players, particularly the one that is not directly controlled by the participant but rather one "opposing" the human player/participant. This motion may be arbitrary or may be subject to additional inputs such as the instantaneous position of the simulated puck, with the latter producing motion of opposition players in the direction of the puck, increasing the probability of the player-and-puck intercepts and therefore, realistic game action, including the scoring of goals by the tape controlled players versus the human player/participants. Subsequent digital words continuously update the vertical and/or horizontal positioning signal inputs applied via line 86.

The participant inputs from manual controls 73 are applied via a line 87.

A numeric generator 88 is also provided and receives, via line 90, an output from the data processing system 74 in accordance with an input to the data processing system from the digital demodulator 20. The output of the digital demodulator periodically commands the unblanking of a portion of the display to provide score numerics and/or time clocks. The output from numerical generator 88 is applied to video summing circuits 66 via a gate 92. Another output from the digital demodulator 20 is applied through the data processing system and outputted thereby via line 94 also to gate 92 to cause the display picture on the raster scan video display 68 to blink which can be used to signal the approaching end of a period of play or any other indication. One or more additional symbol generators 96 are provided to generate symbols representing such things as rink boundaries, goals, lines, etc.

In the embodiments of FIGS. 6 and 7 prerecorded data words can be used to control a large variety of television type game display functions such as guidancce of flying objects, initiating the dropping of simulated bombs and controlling their paths, firing simulated guns at other symbol objects, such as simulated tanks or airplanes, moving balls in a simulated ping pong or billiard game and so forth. Thus, it is to be understood that the embodiments shown are to be regarded as illustrative only, and that many variations and modifications may be made without departing from the principles of the invention herein disclosed and defined by the appended claims.

We claim:

1. Apparatus for playing games on the screen of a television type receiver, comprising:
    at least one symbol generator for generating signals which when coupled to a television type receiver will display on the screen of the receiver a symbol which is moveable over the screen of the receiver to play games;
    a prerecorded audio frequency magnetic recording means having bits of binary coded digital data recorded thereon, said bits comprising instructions to affect the position of the symbol on the screen of the receiver; and
    a demodulator coupled to said prerecorded audio frequency recording means having a plurality of outputs coupled to said symbol generator, each of said outputs providing instruction regarding a different positioning of the symbol on the screen of the receiver.

2. Apparatus as defined in claim 1 wherein said demodulator includes a shift register having an input coupled to said prerecorded audio frequency means and at least two outputs coupled to said symbol generator.

3. Apparatus as defined in claim 2, further including an integrating circuit coupling one of said shift register outputs and said symbol generator.

4. Apparatus for playing games on the screen of a cathode ray tube, comprising:
 means for generating on the screen a first symbol representing a first game playing object which is movable on the screen;
 a prerecorded audio frequency magnetic recording member having binary coded digital data recorded thereon; and
 means for applying said recorded digital data to said generating means for causing said first symbol to move.

5. Apparatus as defined in claim 4, further including:
 means for generating on the screen a second symbol representing a second game playing object which is movable on the screen; and
 a player actuable means for causing said second symbol to move.

6. Apparatus as defined in claim 4 further including a digital demodulator coupled to said prerecorded means such that the digital data from said prerecorded means is applied to said digital demodulator in serial fashion with said digital demodulator having a plurality of outputs.

7. Apparatus as defined in claim 4 wherein said digital data is recorded on said prerecorded means in the form of audio tone bursts.

8. Apparatus as defined in claim 6 wherein said digital data is recorded on said prerecorded means in the form of a plurality of different audio tone bursts, said digital demodulator including means for separating said different audio tone bursts.

9. Apparatus as defined in claim 8 wherein said prerecorded means also includes accompaniment recorded thereon.

10. Apparatus as defined in claim 8 wherein said digital demodulator further includes a plurality of detectors coupled to said means for separating said different audio tone bursts.

11. Apparatus as defined in claim 8 wherein said digital demodulator further includes means coupled to said detectors for storing selected digital data.

12. Apparatus as defined in claim 11 wherein said storage means includes a shift register.

13. Apparatus as defined in claim 6, further including means for coupling the outputs of said digital demodulator to said means for generating a first symbol.

14. Apparatus as defined in claim 13 wherein said coupling means includes a plurality of filters coupled to said outputs of said digital demodulator and means coupled to said filters for generating a control signal, said control signal being applied to said means for generating on the screen a first symbol.

15. Apparatus as defined in claim 13, further including means for converting the outputs of said digital demodulator to signals of proper configuration for controlling the position of a symbol generated by said means for generating a first symbol.

16. Apparatus as defined in claim 6, further including means coupled to a single outpuut of said digital demodulator and responsive to the logical ones or zeroes at said output to occasion positioning of said first symbol.

17. Apparatus as defined in claim 6, further including means coupled to outputs of said digital demodulator and responsive to the logical ones and zeroes at said outputs to occasion positioning of said first symbol.

18. Apparatus as defined in claim 17, wherein said positioning means includes a differential amplifier.

19. Apparatus for playing games on the screen of a cathode ray tube, comprising:
 means for generating on the screen symbology having a plurality of visible variables associated therewith and representing game playing elements;
 prerecorded audio frequency magnetic recording member having binary coded digital data recorded thereon;
 a digital demodulator coupled to said prerecorded audio frequency magnetic recording member for providing digital words;
 a data processing system coupled to said digital demodulator and providing inputs to said symbology generating means for influencing the visible variables associated with the displayed symbology.

20. Apparatus as defined in claim 19 wherein said data processing system includes a digital to analog converter for providing signals to position the displayed symbology.

21. Apparatus as defined in claim 19 wherein said data processing system includes a microprocessor for providing logic commands to said symbology generating means.

22. Apparatus as defined in claim 4 wherein said data signal is a continuous bit stream for dynamically changing the movement of said first symbol.

23. Apparatus for playing games on the screen of a cathode ray tube, comprising:
 means for generating on the screen a first symbol representing a first game playing object which is movable on the screen;
 a prerecorded audio frequency magnetic recording member having binary coded digital data recorded thereon;
 a digital demodulator coupled to said audio frequency magnetic recording member such that digital data from said member is applied to said demodulator in serial fashion with said demodulator having a plurality of outputs, said outputs comprising a number of switching signals; and
 at least one game control circuit responsive to said switching signals.

24. Apparatus for playing games on the screen of a television type receiver, comprising:
 game circuits for generating symbology on the screen of the television type receiver;
 a data processing system coupled to said game circuits for controlling the displayed symbology;
 prerecorded audio frequency means having binary coded digital data recorded thereon; and
 means coupling said prerecorded audio frequency means to said data processing system.

25. Apparatus as defined in claim 24 wherein said coupling means includes a digital demodulator coupled to said audio frequency means for demodulating the data recorded thereon.

* * * * *